United States Patent [19]

Willbanks

[11] 4,246,839
[45] Jan. 27, 1981

[54] NONIMPACT PRINTER

[75] Inventor: Charles E. Willbanks, Spartanburg, S.C.

[73] Assignee: Milliken Research Corporation, Spartanburg, S.C.

[21] Appl. No.: 53,853

[22] Filed: Jul. 2, 1979

[51] Int. Cl.$^3$ .......................... G01D 5/44; G03G 15/00
[52] U.S. Cl. ................................ 101/1; 101/DIG. 13; 346/155; 346/140 R; 118/630; 118/DIG. 23; 118/660; 355/10
[58] Field of Search ............... 101/1 R, DIG. 13, 426; 346/150, 153, 155, 157, 75, 165, 140 R; 118/629-633, DIG. 23, 659-660; 96/1 LY; 427/13, 26-27; 355/10, 17; 430/63-64

[56] References Cited

U.S. PATENT DOCUMENTS

| 3,052,213 | 9/1962 | Schaffert | 101/DIG. 13 |
|---|---|---|---|
| 3,152,858 | 10/1964 | Wadey | 346/75 |
| 3,247,825 | 4/1966 | Johnson | 101/DIG. 13 |
| 3,392,705 | 7/1968 | McBride | 118/630 |
| 3,472,676 | 10/1969 | Cassiers et al. | 355/10 X |
| 3,486,922 | 12/1969 | Cassiers et al. | 355/10 X |
| 3,512,177 | 5/1970 | Mutschler et al. | 346/140 R |
| 3,664,298 | 5/1972 | Giaimo, Jr. | 118/DIG. 23 |
| 3,701,337 | 10/1972 | Borelli et al. | 101/DIG. 13 |
| 3,885,960 | 5/1975 | Anderson | 101/DIG. 13 |
| 3,901,188 | 8/1975 | Eberlein | 355/10 X |

FOREIGN PATENT DOCUMENTS

| 2056871 | 5/1971 | Fed. Rep. of Germany | 355/10 |
|---|---|---|---|
| 2257150 | 5/1973 | Fed. Rep. of Germany | 101/DIG. 13 |
| 2009567 | 2/1970 | France | 355/10 |

Primary Examiner—E. H. Eickholt
Attorney, Agent, or Firm—George M. Fisher; H. William Petry

[57] ABSTRACT

A method and apparatus for printing on a receptor is disclosed. The apparatus includes an advancing mechanism for advancing the receptor, a first applicator for applying an insulating liquid to the receptor, a second applicator for applying conductive liquid to the receptor, and an electric field inducing means mounted opposite to the second applicator. The electric field inducing means can be energized to cause the conductive liquid to penetrate the insulating liquid and print on the receptor.

3 Claims, 10 Drawing Figures

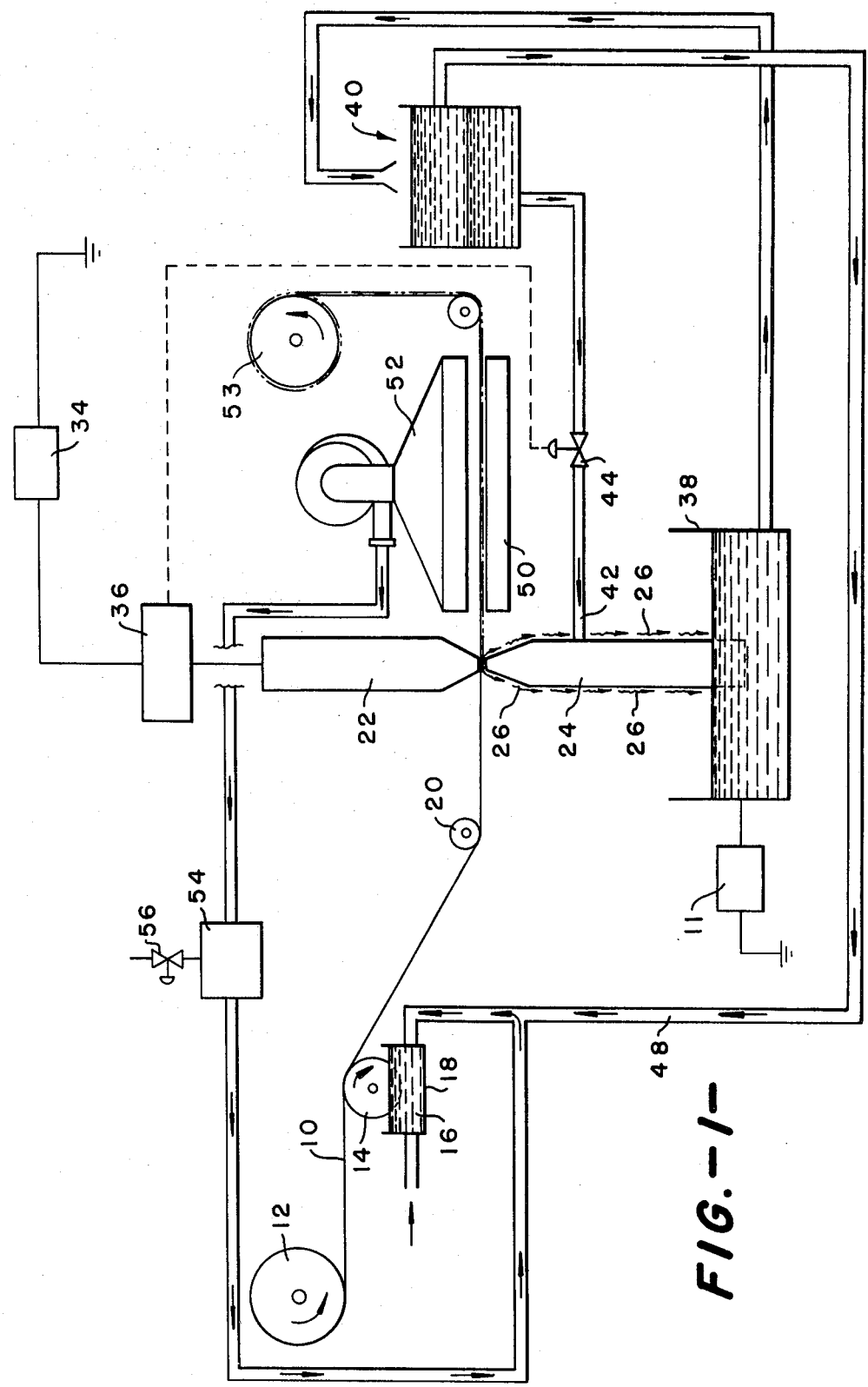

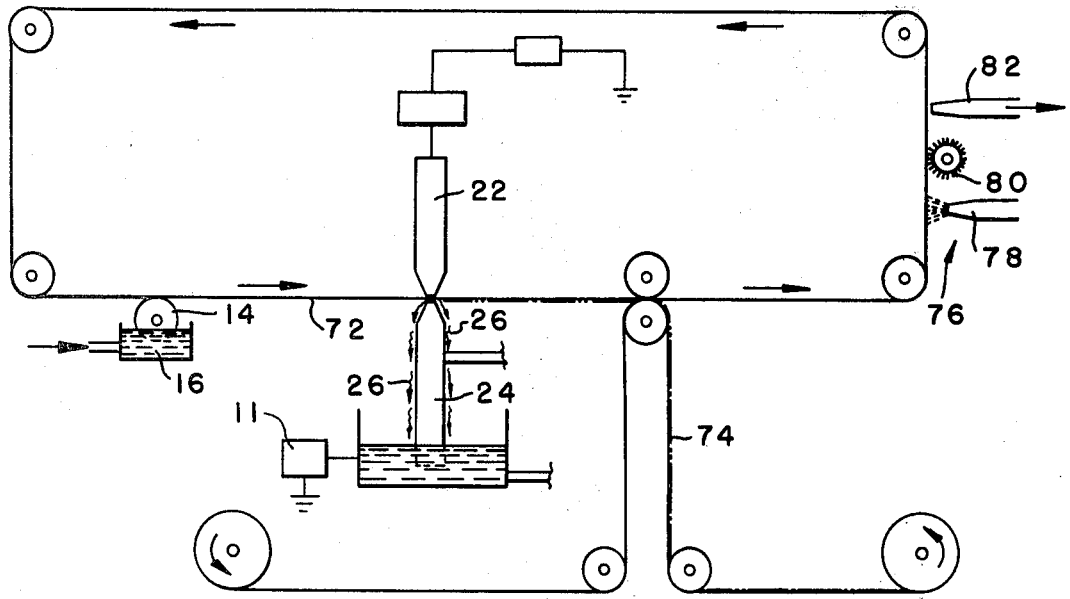
FIG.-6-
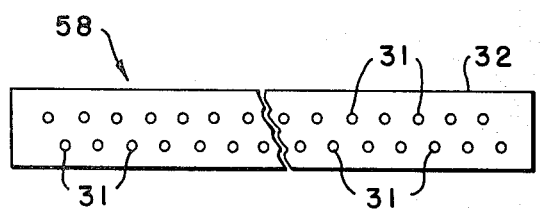
FIG.-4-
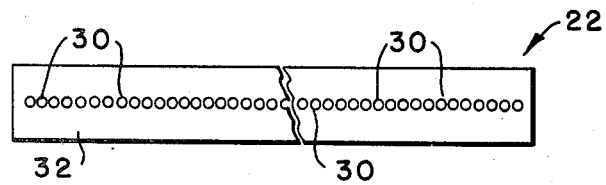
FIG.-3-
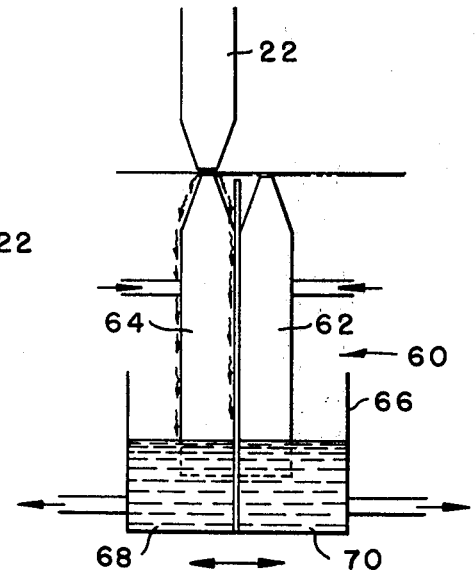
FIG.-5-
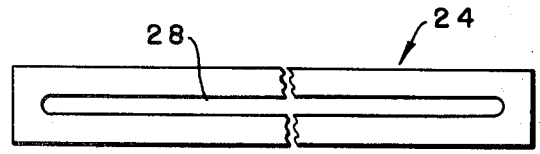
FIG.-2-

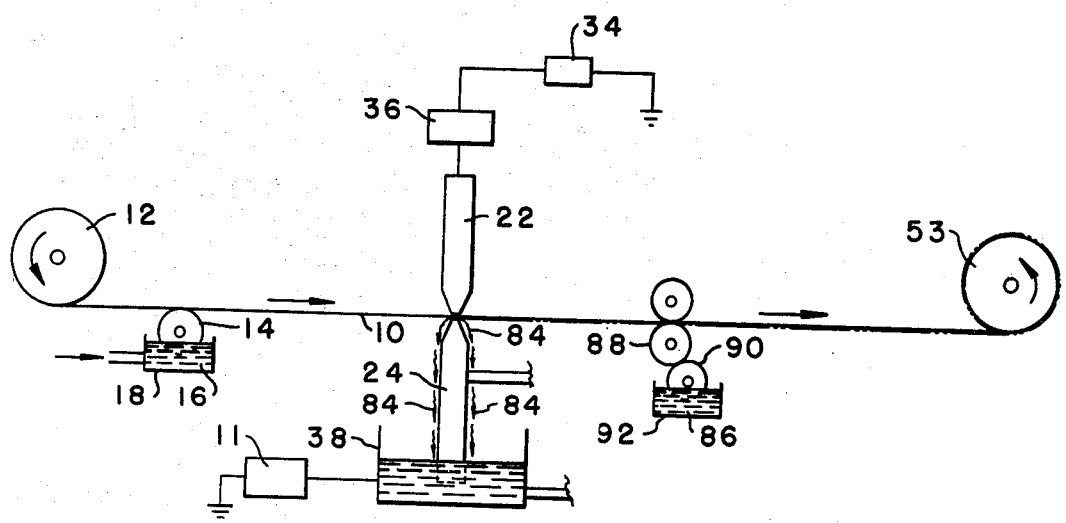
FIG. -7-
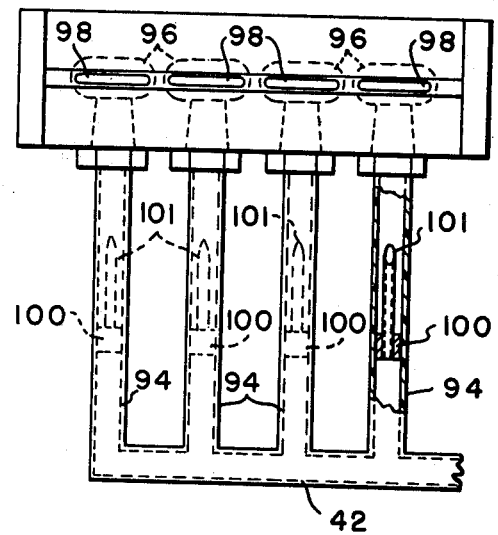
FIG. -8-

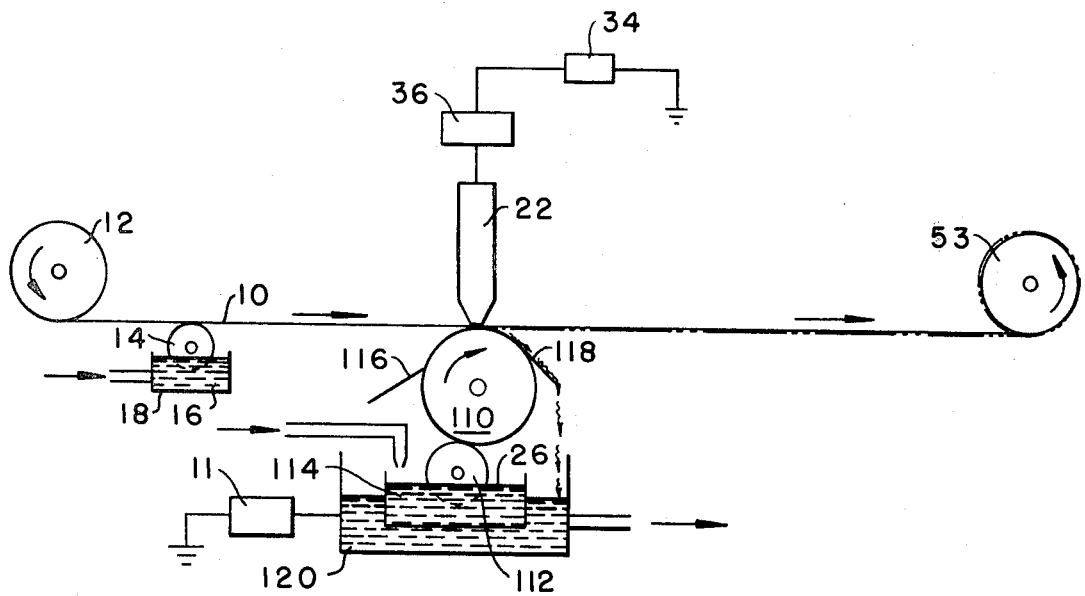
FIG.-9-
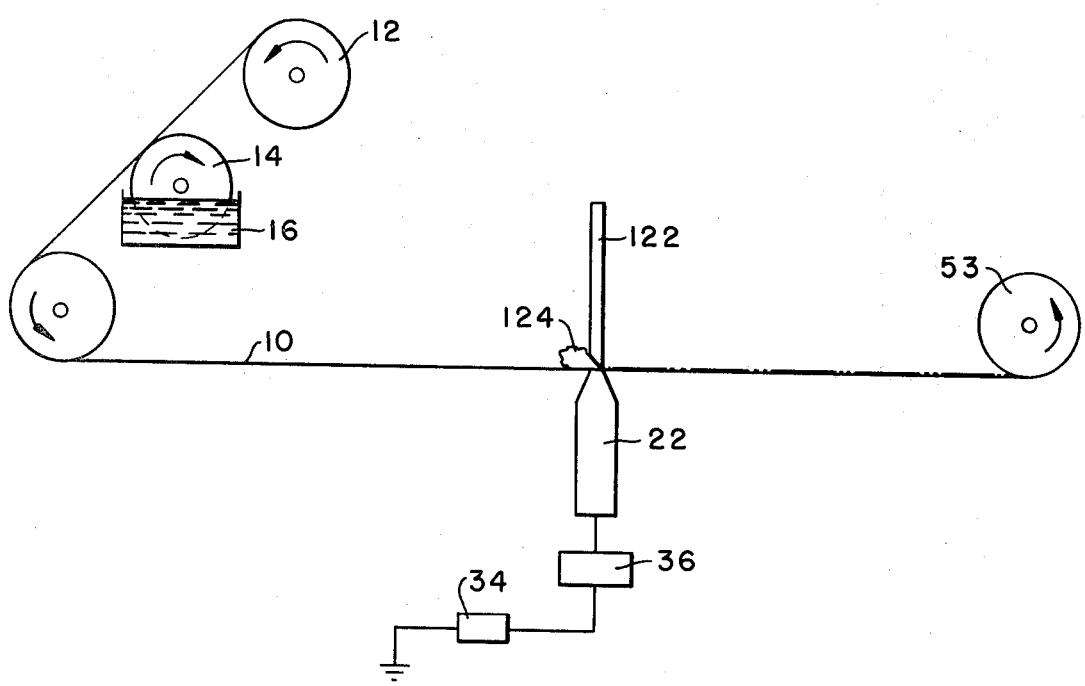
FIG.-10-

NONIMPACT PRINTER

Electrical signals can be converted to printing by a myriad of methods, each having particular advantages and disadvantages. The printer of the present invention is versatile, economical and reliable. It is easily controlled, for example, by a digital computer and can print text or high resolution images on plain (i.e. non-dielectric) paper with very little background. The printer is suitable for use in telecommunications, printing of transfer paper for textiles, general computer output use and other hard copy printing such as books, magazines, letters, etc.

The apparatus of the present invention includes an advancing mechanism for advancing a receptor sheet through the apparatus, a first applicator for applying a film of an insulating liquid to the image side of the receptor sheet, a second applicator for contacting conductive ink with the film of insulating liquid on the image side of the receptor sheet, and an array of addressable styli disposed on the reverse side of the receptor sheet opposite the second applicator and a means to dry the receptor sheet. In one form of the invention, a fountain will be used for flowing conductive ink against the film of insulating liquid while in other embodiments, the fountain is replaced by an immersion roll or doctor blade arrangement. Optionally, the apparatus will include a system for separating and recycling ink and insulating liquid, a system for evaporating and recycling insulating liquid and a system for controlling the amount of ink supplied to the applicator in correlation with the area to be printed on the receptor sheet. In one embodiment, the image is printed directly onto paper which is thus the receptor sheet while in another embodiment, a mirror image is printed onto a reusable receptor medium and is then transferred to the paper or other substrate. In this second embodiment, a mechanism for cleaning the reusable receptor sheet is included and the receptor sheet takes the form of an endless belt.

In another embodiment, water or some other conductive liquid is image wise applied by the first applicator and thereafter the receptor medium is contacted with a roll coated with viscous ink. If the viscous ink is miscible with water and immiscible with the insulating liquid, the water covered area will be printed while if the ink is immiscible with water, but miscible with the insulating liquid, the area covered with insulating liquid will become printed while the water covered area will remain blank.

When wide receptor sheets or webs are to be printed with a fountain applicator, it has proved advantageous to employ a segmented ink applicator which has a plurality of sections and a means for equalizing the flow of ink through each section of the fountain.

BRIEF DESCRIPTION OF THE DRAWINGS

FIG. 1 is a schematic illustrating an embodiment which is suitable for printing directly on to plain paper.

FIG. 2 is a schematic end view of a fountain.

FIG. 3 is a schematic end view of one form of stylus bar.

FIG. 4 is a schematic end view of another form of stylus bar.

FIG. 5 is a schematic illustrating a fountain arrangement which is capable of quick color changes.

FIG. 6 is a schematic illustrating an embodiment wherein the image is printed onto a reusable belt then wet transferred to paper, fabric or other substrate.

FIG. 7 illustrates embodiments wherein a conductive, polar liquid is applied through the fountain and then a viscous ink is applied by a roller.

FIG. 8 illustrates a segmented fountain which is suitable for use when wide webs are to be printed.

FIG. 9 illustrates an embodiment in which an applicator roll is substituted for the fountain.

FIG. 10 is still a further embodiment illustrating the use of a doctor blade in place of the fountain shown in FIGS. 1–7.

DESCRIPTION OF THE PREFERRED EMBODIMENTS

In FIG. 1, paper 10 stored on roll 12, passes over applicator roll 14 which is partially immersed in insulating liquid 16 in tray 18. Applicator roll 14 applies a layer of insulating liquid 16 to paper 10 which then passes around roll 20, past stylus bar 22 which is opposite fountain 24. Conductive ink or dye 26 flows through slot 28 in fountain 24 (shown in FIG. 2) against the layer of insulating liquid 16 coating paper 10. If desired, a voltage source, such as battery 11, may be employed as a biasing means to allow lower potential to be applied to stylus bar 22 and to allow reversal of the printed image.

As shown in FIG. 3, stylus bar 22 has a row of styli 30 surrounded by insulator 32. Computer 34 acting through high voltage driver 36 controls the potential on each of styli 30 in accordance with the signal or pattern to be printed. When no stylus 30 is energized, ink 26 flows against the layer of film insulating liquid 16 but does not wet paper 10, thus no image is printed. When a stylus 30 is energized, conductive ink 26 opposite stylus 30 penetrates the layer of insulating liquid 16 and wets paper 10. Surplus ink 26 and insulating liquid 16 flows down the sides of fountain 24 into trough 38, then into separating tank 40. Ink is supplied to fountain 24 through inlet line 42 controlled by valve 44 which may be regulated by high voltage driver 36 controlled by computer 34, so that ink flows through line 42 at approximately the rate at which it is consumed in printing. Surplus insulating liquid is recycled through line 48 to tray 18. After printing, the image on paper 10 is fixed by heater 50 which evaporates both insulating liquid 16 and the liquid (usually water) in conductive ink 26. The imaged paper 10 can then be taken up on take-up roll 53 and transported to another location for printing on other paper, fabric or etc., or it can be placed in line with a transfer machine to accomplish the same result without the use of a take-up roll 53. The vapors are collected by hood 52, and passed to condensor 54 which condenses the insulating liquid 16 which is recycled to tray 18. Small amounts of water vapor are vented through vent 56 into the atmosphere.

Any hydrophobic insulating liquid which will wet the receptor surface and prevent the conductive ink from contacting the receptor in the absence of an electric field is suitable for use as the insulating liquid in the present invention. This includes liquid paraffins, n-pentane, n-hexane, and Isopar E, G, H and K (a trademark of Exxon).

The conductive ink or dye used in the present invention will include a liquid and a coloring agent. Suitable liquids include water, isopropanol, ethylene glycol monomethyl ether, diethylene glycol monomethyl ether and triethylene glycol monobutyl ether. It is not necessary that the pure liquid be conductive if the admixture of liquid and dye stuff, pigment or other coloring matter is conductive.

Any dye stuff pigment or other coloring matter which can be dissolved or otherwise dispersed in the conductive liquid may be used as a coloring agent. While most dye stuff and ink preparations include surfactant, it is often advantageous to include an additional surfactant in the conductive ink. Suitable surfactants include acetone, methyl ethyl ketone, sodium lauryl sulfate and sodium dodecyl benzene sulfonate.

FIG. 2 illustrates slot 28 in fountain 24. For printing of alphanumeric material or designs with fine detail slot 28 should be relatively narrow, normally no more than about 2 millimeters in width, and preferably about 0.2 millimeters wide measured in the direction in which the paper travels. The length of slot 28 should be sufficient to accommodate the width of paper 10 or other receptor sheet used.

FIG. 3 illustrates the preferred stylus bar for use in the present invention. A single row of conductors or styli 30 are embedded in insulator 32 and the electric potential on each is individually variable. When a selected stylus 30 is energized it causes a line to be printed on the receptor 10 for as long as the stylus is activated. The voltage required to cause the conductive ink to penetrate the film of insulating liquid will vary with the specific conditions used, but voltages of from about 100 to about 400 volts are usually sufficient. The width of the line formed and the amount of ink transferred depends upon the potential to which the stylus is raised and the amount of time that the stylus is held at that potential. For example, if the stylus 30 is energized to 400 volts, the line printed will be wider than if the stylus 30 is energized to 200 volts. By properly varying the potential on the stylus, it is possible to print lines which are wider, narrower or the same width as the stylus. The length of the line is controlled by the length of time that the stylus is energized. By this means, it is possible to print solid areas, half tones or any other desired pattern. Further, it is possible to enhance the readability of alphanumeric output by properly controlling the size of each dot or the width of each line in each figure.

FIG. 4 illustrates an alternative stylus bar 58 for use in the present invention having two staggered rows of conductors or styli 31 embedded in an insulator 32. The stylus bar illustrated in FIG. 3 is preferred over that illustrated in FIG. 4 since no delay compensation is required and since not as much pressure is required between insulator 32 and paper 10 to bring paper 10 into the optimum degree of contact with styli 30.

FIG. 5 illustrates an alternative applicator 60 for use with the present invention. The applicator comprises two or more body members 62 and 64 each having a slot and being connected to its respective ink supply. For example, body member 62 may be supplied with black ink while body member 64 is supplied with red.

Body members 62 and 64 are fixed to each other and rest in trough 66 having left section 68 and right section 70. Trough 66 is slidable so that either body member 62 or body member 64 may be opposed to stylus bar 22. In this manner, quick color changes are possible.

FIG. 6 illustrates an alternative arrangement in which endless belt 72 is substituted for paper 10. As before, insulating liquid 16 is applied by applicator 14, the image is formed at fountain 24 by the action of the electric field created by stylus bar 22 on conductive ink 26. Thereafter, the wet image is transferred from belt 72 to receptor 74 which may be paper, fabric or any suitable substrate. After the image is transferred, belt 72 passes cleaning station 76 shown here as comprising sprayer 78 for spraying cleaning liquid against belt 72, brush 80 for scrubbing belt 72 and vacuum 82 for removing residual cleaning liquid from belt 72.

In many applications, it will be desirable to use a high viscosity ink or dye which would not flow through fountain 24 easily. FIG. 7 illustrates an embodiment in which water 84 or some other suitable conductive liquid is applied to paper 10 through fountain 24 and viscous ink 86 is applied to paper 10 by roller 88 which presses against transfer roller 90 partially immersed in ink 86 in trough 92.

If viscous ink 86 is immiscible with the insulating liquid and miscible with the water, it will only wet the areas which are coated with water on paper 10 while leaving the areas coated with insulating liquid unprinted. If viscous ink 86 is miscible with the insulating liquid and immiscible with the water, it will preferentially wet the areas which are coated with insulating liquid. In either case, it is possible to include a volatile solvent in the viscous ink which will dry quickly, thus facilitating fixing the image.

FIG. 8 illustrates a segmented fountain which is advantageous for printing on webs of appreciable width. Ink 26 flows through inlet line 42, to a plurality of direct inlet lines 94 then into chambers 96 and out through slots 98. When the conductive ink has properties similar to water each slot 98 may be 0.2 millimeters wide and about 13 millimeters long. Each line 94 has a flow restrictor 100 placed in it which tends to equalize the flow of ink through each line 94 thus equalizing the flow out of each slot 98. Each flow restrictor 100 has a capillary 101 therethrough. It has been found that when webs of appreciable width are printed using a non-segmented fountain, the flow through the slit tends to channelize thus printing occurs only on a portion of the web. The flow restrictors 100 serve to insure that the static pressure at each point along the interface will be sufficient to rupture the meniscus in each slit 98. The dimensions of the capillary will vary depending upon slit width, paper speed, ink viscosity and the geometry of the channels, however, if the capillaries are sized so that the static pressure along each meniscus will always exceed the pressure required to break that meniscus, then channelization can be avoided. The dimensions of the capillary can easily be determined using principles of fluid mechanics which are well known to both mechanical and chemical engineers. When conductive inks having properties similar to water are used, a capillary 0.3 millimeters in diameter and about 40 millimeters long will normally provide sufficient resistance to equalize the flows. Of course, an orifice plate can be substituted for the capillary but care should be taken that the pressure drop is sufficient while the hole in the orifice plate is large enough to not become clogged by particles in the ink.

FIG. 9 illustrates an alternative embodiment in which a roll is substituted for the fountain. This embodiment is similar to the previous embodiments except that conductive ink 26 is brought into contact with insulating liquid 16 on paper 10 by transfer roll 110 which presses against pickup roll 112 immersed in trough 114. Excess ink 26 is doctored off of transfer roll 110 by first doctor blade 116 while an admixture of ink 26 and insulating liquid 16 is doctored off of transfer roll 110 by second doctor blade 118 and then drained into tray 120.

If it is desired to use the applicator of FIG. 9 and to have the capability of quick color change, the arrangement disclosed in FIG. 5 can be used. In this type of arrangement, two or more pick up rolls 112 and transfer rolls 110 will be used with a segmented trough 114 which can be slidably mounted to move the desired transfer roll 110 into operative position relative to the material to be printed.

FIG. 10 is a modification substituting a doctor blade 122 for the fountain 24 or the applicator roll 10 to apply the dye or ink 124 to the upper surface of the paper 10 opposite the stylus bar 22 which is located on the underside of the paper 10.

The following examples are provided to illustrate the invention more fully.

EXAMPLE I

Non-dielectric paper sold by Blandin Paper Company, under the tradename "Rotoblade" was drawn over a roller which applied approximately 6 to 7 grams per square meter of an insulating hydrocarbon liquid which in this example was mineral oil. The coated paper was then drawn between a stylus bar and an electrically grounded fountain with the coated side of the paper adjacent to the fountain but about an eighth of a millimeter from it. Each slot in the fountain was approximately 0.2 millimeters wide and 13 millimeters long while the speed of the paper was approximately 17 centimeters per second and the amount of dye applied was approximately 14 milliliters per minute. The stylus bar used was an in line type having approximately 4 spaced styli per millimeter, each surrounded by a non-conductive epoxy resin, each stylus being grounded when no image was desired adjacent to it but being energized to about 400 volts in accordance to the pattern information supplied by a digital computer. The ink contained approximately 20% of a red dye sold by Ciba Geigy as Teraprint Red 3G, about 77.5% distilled water and about 2.5% of an anionic surfactant sold by duPont under the trade name Duponol WAQE. After printing, the paper was air dried and a sharp well defined image was obtained.

EXAMPLE II

The procedure of Example I was repeated replacing the ink with a black ink sold as Rapidograph Black by Koh-I-Noor Rapidograph Co. Sharp, well defined images were obtained.

EXAMPLE III

The procedure of Example I was repeated using 300 volt signals and a twin fountain printer. The dye of Example I was supplied to one fountain while the dye supplied to the other fountain was similar but the Teraprint Red 3G was replaced by Teraprint Blue 2R. Sharp, well defined images were formed with either fountain opposed to the stylus bar and it was possible to quickly change from one color to the other.

EXAMPLE IV

The procedure of Example I was repeated using 240 volt signals and a roller ink applicator was substituted for the fountain. The ink contained 180 grams of a 10% active solution of sodium lauryl sulfate, 21.2 grams of SE-4 thickener, manufactured by ABCO, Inc., 180 g of Teraprint Red 3G dye (Ciba-Geigy), 540 g of water, and 6 drops of Nopco 267° F. defoamer. The gap between the paper and the ink roll was 0.23 mm. Sharp, well defined, background free images were obtained.

EXAMPLE V

The procedure of Example I was repeated using 300 volt signals and replacing the fountain with a doctor blade arrangement and the stylus positioned below the paper. The dye of Example I was supplied to the upstream side of the doctor blade. Sharp, well defined images were obtained.

Although the preferred embodiments of the invention have been described specifically, it is contemplated that changes may be made without departing from the scope or spirit of the invention and I desire to be limited by the scope of the claims.

As my invention, I claim:

1. An improved apparatus for printing on a receptor surface of the type having:
   means for advancing said receptor surface;
   means for applying an insulating liquid to one side of said receptor surface;
   fountain means for contacting polar, conductive liquid with the insulating liquid on said receptor surface, said polar, conductive liquid being substantially immiscible with said insulating liquid;
   stylus bar means disposed opposite said fountain means, said receptor surface passing between said fountain means and said stylus bar means, said stylus bar means including a plurality of energizable styli;
   means for individually energizing said styli;
   wherein the improvement comprises said fountain means including
   a body member having a plurality of cavities formed therein each said cavity having an inlet through which polar conductive liquid may enter and an outlet through which said liquid may contact said insulating liquid on said receptor surface;
   means for supplying polar, conductive liquid to each said inlet, and
   flow restrictor means for insuring that the static pressure at each said outlet is sufficient to rupture any meniscus which may form at said outlet.

2. The apparatus of claim 1 wherein the flow restrictor means comprises a capillary means.

3. An improved apparatus for printing on a receptor surface of the type having:
   means for advancing said receptor surface;
   means for applying an insulating liquid to one side of said receptor surface;
   fountain means for contacting polar, conductive liquid with the insulating liquid on said receptor surface, said polar, conductive liquid being substantially immiscible with said insulating liquid;
   stylus bar means disposed opposite said fountain means, said receptor surface passing between said fountain means and said stylus bar means, said stylus bar means including a plurality of energizable styli;
   means for individually energizing said styli;
   wherein the improvement comprises said fountain means including a body member having a plurality of passages formed therein through which conductive liquid may flow and means for equalizing the flow through each flow passage.

* * * * *